United States Patent
Masuko et al.

(10) Patent No.: US 11,318,584 B2
(45) Date of Patent: May 3, 2022

(54) ATTACHMENT JIG AND ATTACHMENT METHOD

(71) Applicant: MITSUBISHI HEAVY INDUSTRIES, LTD., Tokyo (JP)

(72) Inventors: Tetsuyuki Masuko, Tokyo (JP); Takatsugu Nagahama, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 166 days.

(21) Appl. No.: 16/632,745

(22) PCT Filed: Sep. 29, 2017

(86) PCT No.: PCT/JP2017/035520
§ 371 (c)(1),
(2) Date: Jan. 21, 2020

(87) PCT Pub. No.: WO2019/064501
PCT Pub. Date: Apr. 4, 2019

(65) Prior Publication Data
US 2020/0406430 A1  Dec. 31, 2020

(51) Int. Cl.
*B25B 11/00*  (2006.01)
*B25B 11/02*  (2006.01)
(Continued)

(52) U.S. Cl.
CPC ............ *B25B 11/02* (2013.01); *B25B 5/12* (2013.01); *B25B 5/006* (2013.01); *B25B 5/101* (2013.01)

(58) Field of Classification Search
CPC  B25B 11/00; B25B 11/02; B25B 5/00; B25B 5/12; B23Q 3/00
See application file for complete search history.

(56) References Cited

U.S. PATENT DOCUMENTS 4,002,328 A * 1/1977 Wolff ...................... B25B 1/103
269/97
4,247,090 A * 1/1981 Hahn ...................... B25B 5/142
269/295
(Continued)

FOREIGN PATENT DOCUMENTS

JP  2017-061002 A  3/2017

OTHER PUBLICATIONS

PCT/ISA/210, "International Search Report for International Application No. PCT/JP2017/035520," dated Nov. 7, 2017.
(Continued)

*Primary Examiner* — Lee D Wilson
(74) *Attorney, Agent, or Firm* — Manabu Kanesaka; Benjamin Hauptman; Kenneth Berner

(57) ABSTRACT

An attachment jig includes a pressing member having a positioning portion configured to position a target component in a direction where an attachment target surface of a fixing target member extends, and a pressing portion configured to press the target component positioned by the positioning portion toward the attachment target surface, and a detachment member having a first abutting portion configured to come into contact with the attachment target surface, the first support surface, and the second support surface, and a second abutting portion configured to come into contact with the pressing member on the attachment target surface, is the detachment member being configured to cause the pressing member to be positioned in a direction where the attachment target surface extends with respect to the first support surface and the second support surface, and detachable from the pressing member.

5 Claims, 6 Drawing Sheets

(51) Int. Cl.
*B25B 5/12* (2006.01)
*B25B 5/00* (2006.01)
*B25B 5/10* (2006.01)

(56) References Cited

U.S. PATENT DOCUMENTS

2006/0049567 A1* 3/2006 Nishimura ................ B25B 5/12
  269/228
2009/0152786 A1* 6/2009 Iwata ........................ B25B 5/04
  269/89
2020/0406430 A1* 12/2020 Masuko .................. B25B 5/003

OTHER PUBLICATIONS

PCT/ISA/237, "Written Opinion of the International Searching Authority for International Application No. PCT/JP2017/035520," dated Nov. 7, 2017.

* cited by examiner

ATTACHMENT JIG AND ATTACHMENT METHOD

RELATED APPLICATIONS

The present application is National Phase of International Application No. PCT/JP2017/035520 filed Sep. 29, 2017, the disclosure of which is hereby incorporated by reference herein in its entirety.

TECHNICAL FIELD

The present invention relates to an attachment jig and an attachment method.

BACKGROUND ART

A plurality of small components such as fuel pipes and brackets for holding electrical components are fixed to long components such as stringers and spars forming a main wing of an aircraft. In a case of fixing such small components with an adhesive as a fixing target, a positioning jig for disposing a target component at an attachment position or a clamping jig for pressing the target component against the long components until the adhesive is cured are required.

For example, PTL 1 describes a crimping jig device that crimps an attachment component as a fixing target to a crimping target member. In the crimping jig device, the attachment component is pressed against the crimping target member by a device main body portion with a positioning pin inserted into a mounting hole formed in a crimping member. Furthermore, in the crimping jig device, an engaging portion is engaged with an engaging target portion protruding from the crimping target member, so that rotation of the device main body portion is regulated, and the attachment component is supported so as not to rotate with respect to the crimping target member.

CITATION LIST

Patent Literature

PTL 1: Japanese Unexamined Patent Application first Publication No. 2017-61002

DISCLOSURE OF INVENTION

Technical Problem

However, in a case where the target component as a fixing target is attached to a fixing target member such as a long component, it is necessary to prevent a position of the target component with respect to the fixing target member from shifting until the adhesive is cured. In the crimping jig device described in PTL 1, the target component is continuously pressed against the fixing target member by the device main body portion until the adhesive is cured. Therefore, it is difficult to remove the crimping jig device from the fixing target member until the adhesive is cured. As a result, a work space around the fixing target member is pressed by the crimping jig device until the adhesive is cured. When the work space is pressed, there is a possibility that disposition regulation due to interference with other components and deterioration of work efficiency may occur. In addition, in the crimping jig device described in PTL 1, additional work is required to provide a positioning protrusion on the fixing target member.

An object of the present invention is to provide an attachment jig and an attachment method capable of securing a work space.

Solution to Problem

An attachment jig according to the first aspect of the present invention is an attachment jig used when attaching a target component to an attachment target surface of a fixing target member which includes the attachment target surface, a first support surface extending in a direction intersecting the attachment target surface, and a second support surface extending in a direction intersecting the attachment target surface and the first support surface, including a pressing member that includes a positioning portion configured to come into contact with the target component on the attachment target surface and position the target component in a direction where the attachment target surface extends, and a pressing portion configured to press the target component positioned by the positioning portion toward the attachment target surface, and a detachment member that includes a first abutting portion configured to come into contact with the attachment target surface, the first support surface, and the second support surface, and a second abutting portion configured to come into contact with the pressing member on the attachment target surface, the detachment member being configured to cause the pressing member to be positioned in the direction where the attachment target surface extends with respect to the first support surface and the second support surface, and detachable from the pressing member.

With such a configuration, the position of the target component on the attachment target surface of the fixing target member is determined by the detachment member and the pressing member. In this state, the target component is pressed against the attachment target surface and temporarily fixed by pressing the attachment portion against the attachment target surface with the pressing portion. Only the pressing member and the target component remain on the attachment target surface by removing the detachment member from the pressing member in a state where the target component is temporarily fixed. Therefore, a space on the attachment target surface around the target component can be made until the target component is completely fixed to the fixing target member.

In addition, in the attachment jig according to the second aspect of the present invention, the first aspect may further include a guide portion that configured to guide a movement of the detachment member with respect to the pressing member in a direction inclined with respect to the attachment target surface and the first support surface and parallel to a direction where the second support surface extends.

With such a configuration, it is possible to reduce resistance such as friction that the detachment member receives from the attachment target surface or the first support surface when the detachment member is moved in the inclination direction. As a result, the detachment member can be easily detached from the fixing target member.

In addition, in the attachment jig according to the third aspect of the present invention, in the second aspect, the pressing member may include a pressing member reference surface that comes into contact with the detachment member and extends in a direction intersecting the attachment target surface, the detachment member may include a detachment member contact surface that comes into contact with the pressing member reference surface, and the guide portion may be formed on the pressing member reference surface and the detachment member contact surface.

With such a configuration, it is possible to reduce resistance such as friction that the detachment member receives from the pressing member. As a result, it is easy to cause the detachment member to be detached with respect to the pressing member.

In addition, in the attachment jig according to the fourth aspect of the present invention, in the third aspect, the guide portion may be an inclined surface extending in the inclination direction.

With such a configuration, the guide portion can be provided, without using other members such as a rail.

In addition, in the attachment jig according to the fifth aspect of the present invention, in any one of the first to fourth aspects, the pressing portion may be a toggle clamp.

In addition, in the attachment jig according to the sixth aspect of the present invention, the first to fifth aspects may further include a first temporary fixing member that temporarily fixes the pressing member to the fixing target member, and a second temporary fixing member that temporarily fixes the detachment member to the fixing target member.

With such a configuration, the position of the pressing member with respect to the fixing target member can be temporarily fixed by the first temporary fixing member, and the position of the detachment member with respect to the fixing target member can be temporarily fixed by the second temporary fixing member. Therefore, the detachment member whose position with respect to the fixing target member is determined is difficult to move from the determined position. Similarly, the pressing member whose position with respect to the detachment member is determined is difficult to move from the determined position. As a result, the positioning precision at the time of disposing the target components with respect to the fixing target member via the pressing member and the detachment member can be improved.

In addition, an attachment method according to the seventh aspect of the present invention is an attachment method of attaching a target component to an attachment target surface of a fixing target member which includes the attachment target surface, a first support surface extending in a direction intersecting the attachment target surface, and a second support surface extending in a direction intersecting the attachment target surface and the first support surface, including a preparation step of preparing a pressing member that includes a positioning portion configured to come into contact with the target component on the attachment target surface and position the target component in a direction where the attachment target surface extends, and a pressing portion configured to press the target component positioned by the positioning portion toward the attachment target surface, and a detachment member that includes a first abutting portion configured to come into contact with the attachment target surface, the first support surface, and the second support surface, and a second contact portion configured to come into contact with the pressing member on the attachment target surface, is the detachment member being configured to cause the pressing member to be positioned in a direction where the attachment target surface extends with respect to the first support surface and the second support surface, and detachable from the pressing member, the fixing target member, and the target component, a detachment member disposition step of bringing the first abutting portion into contact with the first support surface and the second support surface to dispose the detachment member on the attachment target surface, a pressing member disposition step of bringing the pressing member into contact with the second abutting portion to dispose the pressing member on the attachment target surface, a target component disposition step of bringing the target component into contact with the positioning portion to dispose the target component applied with an adhesive on the attachment target surface, a pressing step of pressing the target component positioned by the positioning portion toward the attachment target surface with the pressing portion, and a detachment step of detaching the detachment member in contact with the pressing member and the fixing target member from the fixing target member and the pressing member in a state where the target component is pressed against the attachment target surface.

Advantageous Effects of Invention

According to the present invention, it is possible to suppress deterioration in work efficiency due to pressure on the work space.

BEST MODE FOR CARRYING OUT THE INVENTION

Hereinafter, an embodiment of the present invention will be described with reference to the drawings. First, a fixing target member 1 as a target to be attached and a target component 2 as an attachment target in an attachment method S1 using an attachment jig 3 according to the embodiment of the present invention will be described.

Figure 1:
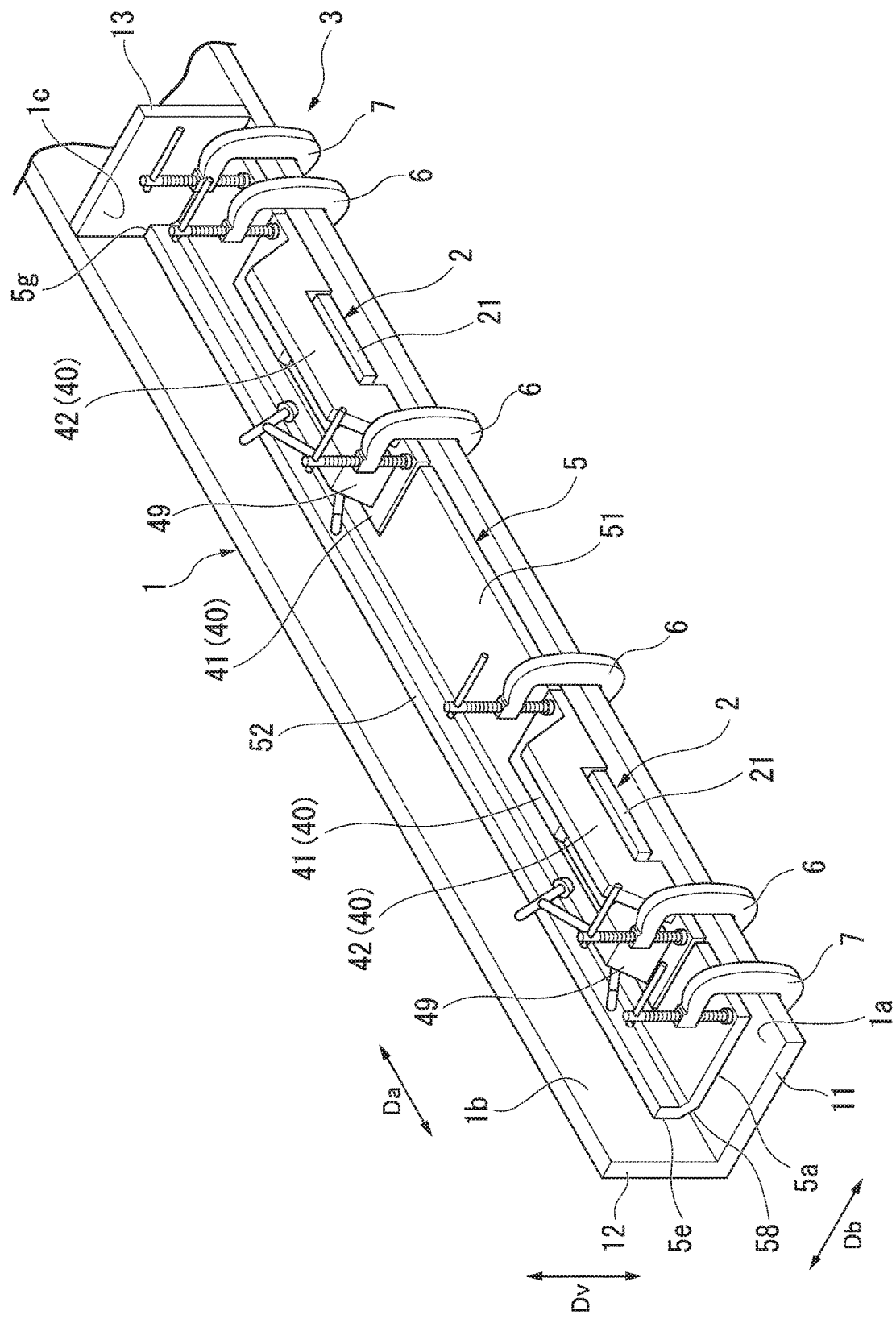
FIG. 1 is a perspective view describing a state where a fixing target member, a target component, and an attachment jig according to an embodiment of the present invention are integrally attached.
Figure 2:
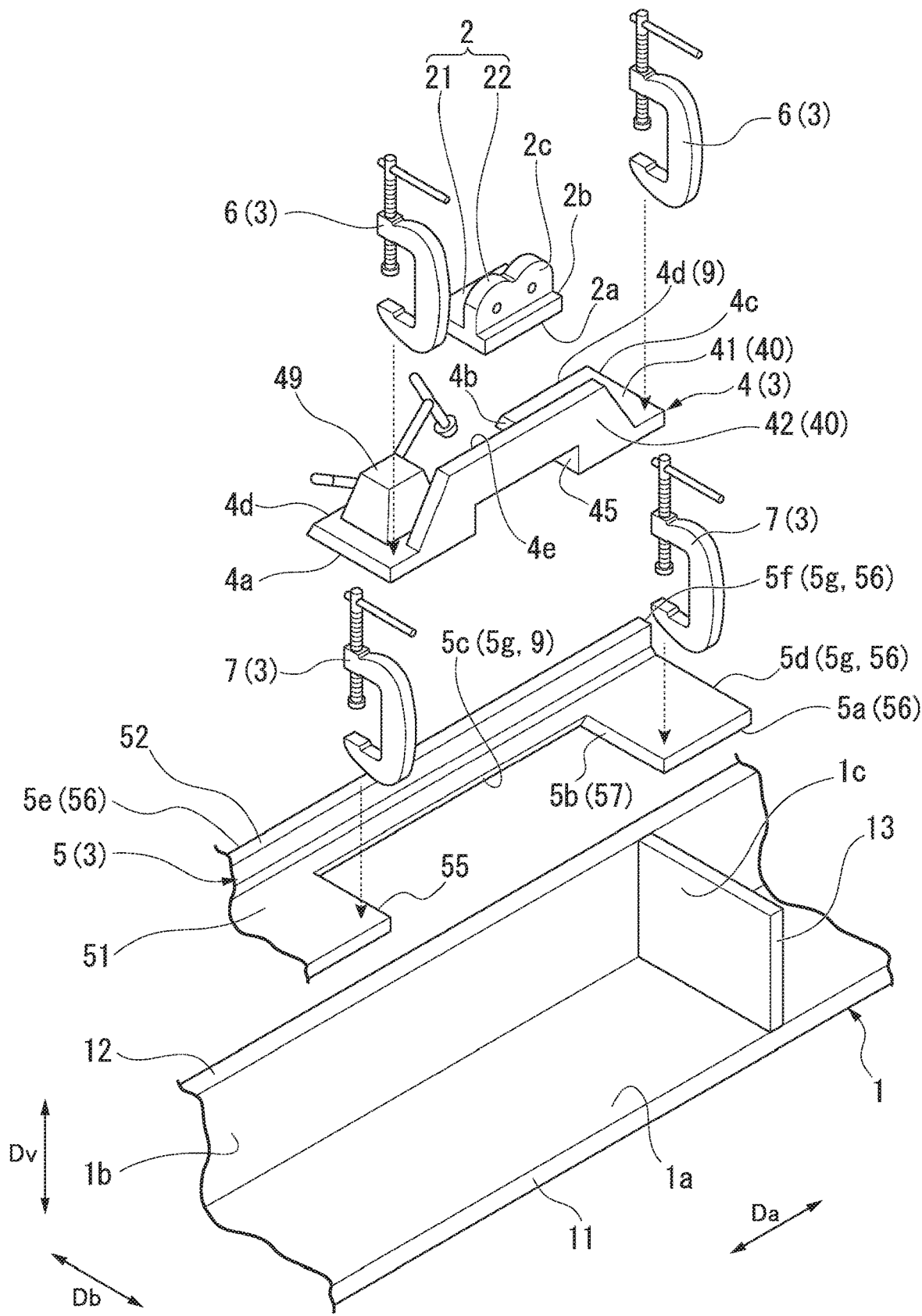
FIG. 2 is a perspective view of a main part describing a state before the fixing target member, the target component, and the attachment jig according to the embodiment of the present invention are attached.

As illustrated in FIG. 1, a plurality of target components 2 are attached to the fixing target member 1. As illustrated in FIG. 2, the fixing target member 1 includes an attachment target surface a, a first support surface 1$b$, and a second support surface 1$c$. The attachment target surface 1$a$ is a surface to which the target component 2 is attached. The first support surface 1$b$ is a surface which extends in a direction which intersects the attachment target surface 1$a$. The second support surface 1$c$ is a surface which extends in a direction which intersects the attachment target surface 1$a$ and the first support surface 1*b*. The target component 2 is not attached to the first support surface 1*b* and the second support surface 1*c*.

The fixing target member 1 according to the present embodiment is a long member that extends so that the attachment target surface 1*a* has a rectangular shape. For example, the fixing target member 1 is a stringer (longitudinal member) that forms a skeleton structure such as a main wing of an aircraft. The fixing target member 1 includes a web portion 11 on which the attachment target surface 1*a* is formed, a flange portion 12 on which the first support surface 1*b* is formed, and a rib portion 13 on which the second support surface 1*c* is formed.

The web portion 11 is a flat plate member extending in a longitudinal direction (first direction) Da. The attachment target surface 1*a* formed on the web portion 11 is a rectangular surface extending in the longitudinal direction Da so that a short direction (second direction) Db orthogonal to the longitudinal direction Da is a short side.

The flange portion 12 is a flat plate member extending in the longitudinal direction Da with a vertical direction (third direction) Dv orthogonal to the longitudinal direction Da and the short direction Db as short sides. The flange portion 12 extends vertically from an end portion on a first side (one side) of the web portion 11 in the short direction Db. In the present embodiment, the flange portion 12 and the web portion 11 are integrally formed, so that the cross-sectional shape orthogonal to the longitudinal direction Da of the fixing target member 1 is formed in an L shape. The first support surface 1*b* formed in the flange portion 12 is a rectangular surface extended in the longitudinal direction Da so that the vertical direction Dv may be a short side. Therefore, the first support surface 1*b* according to the present embodiment is orthogonal to the attachment target surface 1*a*. The first support surface 1*b* is connected to an end portion of the short direction Db of the attachment target surface 1*a*.

Here, in the present embodiment, a side on which the flange portion 12 is formed with respect to the web portion 11 is referred to as a first side of the short direction Db (one side of short direction Db). In addition, a side on which the flange portion 12 is not formed with respect to the web portion 11 is referred to as a second side of the short direction Db (the other side of short direction Db).

The rib portion 13 is a flat plate member extending in the short direction Db and the vertical direction Dv so as to extend vertically to the web portion 11 and the flange portion 12. The rib portion 13 extends vertically from a portion of the web portion 11 and the flange portion 12 in the longitudinal direction Da. The second support surface 1*c* formed in the rib portion 13 is a rectangular surface extended in the short direction Db and the vertical direction Dv. Therefore, the second support surface 1*c* is orthogonal to the attachment target surface 1*a* and the first support surface 1*b*. The second support surface 1*c* is connected vertically to the attachment target surface 1*a* and the first support surface 1*b*.

The target component 2 is a small component attached to the fixing target member 1. An attachment surface 2*a* attached to the attachment target surface 1*a* is formed in the target component 2. The target component 2 according to the present embodiment is a bracket that holds other members such as fuel pipes and electrical components. The target component 2 according to the present embodiment includes an attachment portion 21 on which the attachment surface 2*a* is formed, and a holding portion 22 that extends vertically from the attachment portion 21.

The attachment portion 21 is formed in a rectangular flat plate shape extending in the longitudinal direction Da and the short direction Db. The attachment portion 21 is formed to be parallel to the web portion 11 when attached to the fixing target member 1. The attachment surface 2*a* according to the present embodiment is a surface that faces the attachment target surface 1*a* in a state parallel to the attachment target surface 1*a* in a case where the attachment portion 21 is disposed on the attachment target surface 1*a*.

Here, in the present embodiment, in a state where the target component 2 is attached to the fixing target member 1, a side on which the rib portion 13 is formed with respect to the target component 2 is referred to as a first side in the longitudinal direction Da (one side in the longitudinal direction Da). In addition, in a state where the target component 2 is attached to the fixing target member 1, a side on which the rib portion 13 is not formed with respect to the target component 2 is referred to as a second side in the longitudinal direction Da (the other side in the longitudinal direction Da).

In the attachment portion 21, an end surface on the first side in the longitudinal direction Da is a first reference surface 2*b* servings as a reference when positioning in the longitudinal direction Da. The first reference surface 2*b* is a surface orthogonal to the attachment surface 2*a*.

The holding portion 22 is formed in a flat plate shape extending in the longitudinal direction Da and the vertical direction Dv. The holding portion 22 is formed to be parallel to the flange portion 12 when attached to the fixing target member 1. The holding portion 22 extends vertically from a middle of a surface facing a side opposite to the attachment surface 2*a* in the short direction Db. In the present embodiment, the holding portion 22 and the attachment portion 21 are formed integrally, so that in the target component 2, the cross-sectional shape orthogonal to the longitudinal direction Da is formed in T shape. The holding portion 22 is formed with a second reference surface 2*c* as a surface orthogonal to the attachment surface 2*a* and the first reference surface 2*b*. The second reference surface 2*c* is a flat surface of the holding portion 22 facing the first side in the short direction Db in a state where the target component 2 is disposed on the attachment target surface 1*a*. A through-hole for attaching another member is formed in the holding portion 22 so as to penetrate the second reference surface 2*c*.

Next, details of the attachment jig 3 will be described. The attachment jig 3 is used in the attachment method S1 for attaching and fixing the target component 2 to the attachment target surface 1*a* of the fixing target member 1. As illustrated in FIGS. 1 and 2, the attachment jig 3 positions the target component 2 in a direction where the attachment target surface 1*a* extends (in the present embodiment, for example, horizontal direction including the longitudinal direction Da and the short direction Db). Furthermore, by setting the target component 2 with an adhesive attached to the attachment surface 2*a* to be pressed against the attachment target surface 1*a*, the attachment jig 3 holds the target component 2 on the attachment target surface 1*a* until the adhesive is cured. The attachment jig 3 according to the present embodiment is a pressing member 4, a detachment member 5, a first temporary fixing member 6, a second temporary fixing member 7, and a guide portion 9.

The pressing member 4 temporarily fixes the target component 2 on the attachment target surface 1*a*. The pressing member 4 according to the present embodiment includes a positioning portion 40 and a pressing portion 49.

The positioning portion 40 can come into contact with the target component 2 and the detachment member 5 on the attachment target surface 1a. The positioning portion 40 can position the target component 2 in a horizontal direction with respect to the detachment member 5 on the attachment target surface 1a. The positioning portion 40 according to the present embodiment includes a first positioning portion 41 and a second positioning portion 42.

Figure 4:
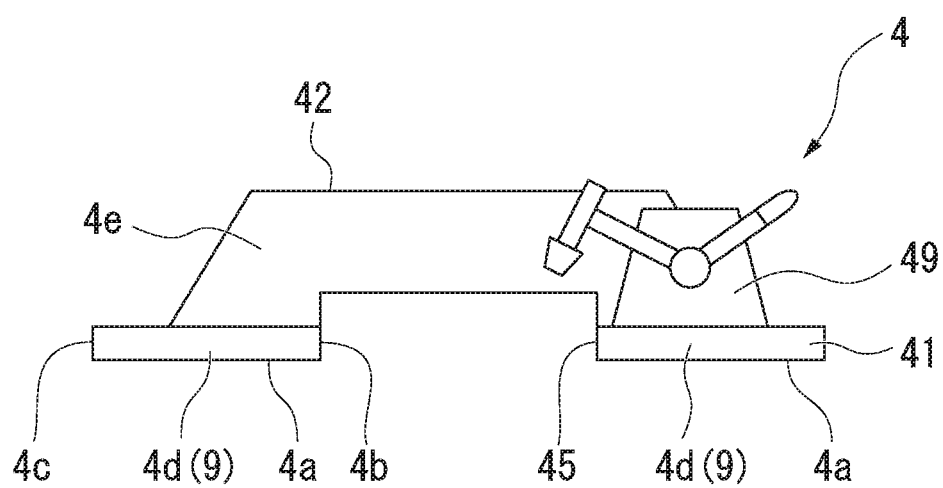
FIG. 4 is a side view illustrating a pressing member according to the embodiment of the present invention.

The first positioning portion 41 can position the target component 2 in the longitudinal direction Da on the attachment target surface 1a. The first positioning portion 41 can come into contact with the attachment portion 21 of the target component 2. The first positioning portion 41 has a rectangular plate shape extending in the longitudinal direction Da and the short direction Db. As illustrated in FIG. 4, the first positioning portion 41 according to the present embodiment is formed as two rectangular plates separated in the longitudinal direction Da by forming a notch in a central portion in the longitudinal direction Da. The first positioning portion 41 includes a first abutting surface 4a, a pressing member first contact surface 4b, a pressing member first reference surface (pressing member reference surface) 4c, and a pressing member second reference surface (pressing member reference surface) 4d.

The first abutting surface 4a is a surface that can come into contact with the attachment target surface 1a. As illustrated in FIGS. 1 and 2, the first abutting surface 4a is a surface that faces the attachment target surface 1a in a parallel state in a case where the attachment jig 3 is disposed on the attachment target surface 1a.

The pressing member first contact surface 4b is a surface serving as a reference when positioning the target component 2 in the longitudinal direction Da with respect to the pressing member 4 on the attachment target surface 1a. The pressing member first contact surface 4b is a surface that can come into contact with the first reference surface 2b of the attachment portion 21. The pressing member first contact surface 4b according to the present embodiment is a surface formed in a notch portion of the first positioning portion 41. The pressing member first contact surface 4b faces the second side in the longitudinal direction Da. The pressing member first contact surface 4b is a surface orthogonal to the first abutting surface 4a. The pressing member first contact surface 4b is a surface disposed in parallel with the second support surface 1c and faces the same direction in a case where the attachment jig 3 is disposed on the attachment target surface 1a. The pressing member first contact surface 4b is disposed to face the first reference surface 2b in a case where the pressing member 4 is disposed on the attachment target surface 1a with the target component 2.

The pressing member first reference surface 4c is a surface serving as a reference when positioning the pressing member 4 in the longitudinal direction Da with respect to the detachment member 5 on the attachment target surface 1a. The pressing member first reference surface 4c is a surface that can come into contact with the detachment member 5. The pressing member first reference surface 4c according to the present embodiment is an end surface on the first side in the longitudinal direction Da of the first positioning portion 41. The pressing member first reference surface 4c is a surface orthogonal to the first abutting surface 4a. The pressing member first reference surface 4c is parallel to the pressing member first contact surface 4b and faces a side opposite to the longitudinal direction Da. The pressing member first reference surface 4c is disposed to face the second support surface 1c in a case where the attachment jig 3 is disposed on the attachment target surface 1a.

Figure 3:
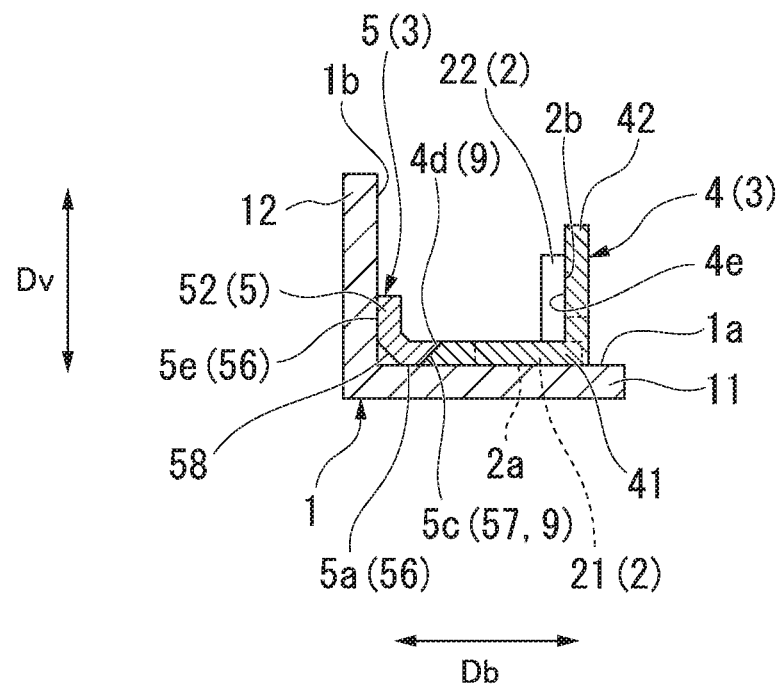
FIG. 3 is a cross-sectional view illustrating the fixing target member and the attachment jig according to the embodiment of the present invention.

The pressing member second reference surface 4d is a surface serving as a reference when positioning the pressing member 4 in the short direction Db with respect to the detachment member 5 on the attachment target surface 1a. The pressing member second reference surface 4d is a surface that can come into contact with the detachment member 5. The pressing member second reference surface 4d according to the present embodiment is an end surface on the second side of the first positioning portion 41 in the short direction Db. The pressing member second reference surfaces 4d are formed in both the first positioning portions 41 spaced apart in two. Therefore, in the present embodiment, two pressing member second reference surfaces 4d are provided apart in the longitudinal direction Da. The pressing member second reference surface 4d is a surface orthogonal to the pressing member first reference surface 4c and the pressing member first contact surface 4b. As illustrated in FIG. 3, the pressing member second reference surface 4d is inclined with respect to the first abutting surface 4a. Specifically, the pressing member second reference surface 4d is an inclined surface inclined so that an angle formed with the first abutting surface 4a is an acute angle.

As illustrated in FIGS. 1 and 2, the second positioning portion 42 can position the target component 2 in the short direction Db on the attachment target surface 1a. The second positioning portion 42 can come into contact with the holding portion 22 of the target component 2. The second positioning portion 42 has a flat plate shape extending in the longitudinal direction Da and the vertical direction Dv. The second positioning portion 42 according to the present embodiment connects the first positioning portion 41 formed apart in the longitudinal direction Da. Specifically, the second positioning portion 42 is connected to the first positioning portions 41 formed at an interval in the longitudinal direction Da, respectively, at the end portions on the first side in the short direction Db of the first positioning portion 41. Therefore, the positioning portion 40 according to the present embodiment is formed with a target component storage recessed portion 45 for storing the target component 2 inside, by the first positioning portion 41 and the second positioning portion 42, in a state where the attachment jig 3 is disposed on the attachment target surface 1a. The target component storage recessed portion 45 is a groove portion that opens on the second side in the short direction Db when viewed from the vertical direction Dv in a state where the attachment jig 3 is disposed on the attachment target surface 1a. Therefore, the positioning portion 40 is formed in a C shape with the second side in the short direction Db opened when viewed from above in the vertical direction Dv.

In addition, the second positioning portion 42 includes a pressing member second contact surface 4e. The pressing member second contact surface 4e is a surface serving as a reference when positioning the target component 2 in the short direction Db with respect to the pressing member 4 on the attachment target surface 1a. As illustrated in FIG. 3, the pressing member second contact surface 4e is a surface that can come into contact with the second reference surface 2c of the holding portion 22. The pressing member second contact surface 4e faces the second side in the short direction Db. The pressing member second contact surface 4e is a surface orthogonal to the first abutting surface 4a and the pressing member first contact surface 4b. The pressing member second contact surface 4e is disposed to face the second reference surface 2c in a case where the pressing member 4 is disposed on the attachment target surface 1a with the target component 2. The pressing member second contact surface 4e is a flat surface disposed in parallel to the first support surface 1b and faces in the opposite direction in a case where the attachment jig 3 is disposed on the attachment target surface 1a. The pressing member second contact surface 4e forms the target component storage recessed portion 45 with the pressing member first contact surface 4b.

The pressing portion 49 can press the target component 2 positioned by the positioning portion 40 toward the attachment target surface 1a. The pressing portion 49 according to the present embodiment is a toggle clamp, as illustrated in FIG. 4. The pressing portion 49 is disposed on the first positioning portion 41. The pressing portion 49 can be freely changed between a pressing state where the attachment portion 21 is pressed against the attachment target surface 1a from the first positioning portion 41 and a releasing state where the pressing is released.

As illustrated in FIGS. 1 and 2, the detachment member 5 can come into contact with the pressing member 4 and the fixing target member 1 on the attachment target surface 1a. The detachment member 5 can be positioned in the horizontal direction of the pressing member 4 with respect to the fixing target member 1 on the attachment target surface 1a. Specifically, the detachment member 5 can position the pressing member 4 in the direction where the attachment target surface 1a extends with reference to the first support surface 1b and the second support surface 1c. The detachment member 5 can be detached from the pressing member 4. The detachment member 5 according to the present embodiment includes a detachment main body portion 51 and a detachment reinforcement portion 52.

The detachment main body portion 51 can be positioned in the longitudinal direction Da and the short direction Db of the pressing member 4 on the attachment target surface 1a. The detachment main body portion 51 can be positioned in the longitudinal direction Da of the detachment member 5 with respect to the fixing target member 1 on the attachment target surface 1a. The detachment main body portion 51 can come into contact with the fixing target member 1. The detachment main body portion 51 can come into contact with the first positioning portion 41 of the pressing member 4. The detachment main body portion 51 has a rectangular plate shape extending in the longitudinal direction Da and the short direction Db. A plurality of pressing member storage recessed portions 55 for storing the pressing member 4 and the target component 2 are formed on the inner side of the detachment main body portion 51 according to the present embodiment in a state where the attachment jig 3 is disposed on the attachment target surface 1a. The pressing member storage recessed portion 55 is a groove portion which the first side of the short direction Db opens when viewed from the vertical direction Dv. In addition, the detachment main body portion 51 according to the present embodiment includes a second abutting surface 5a, a detachment member first contact surface (detachment member contact surface) 5b, a detachment member second contact surface (detachment member contact surface) 5c, and a main body portion second support target surface 5d.

The second abutting surface 5a is a surface that can come into contact with the attachment target surface 1a. The second abutting surface 5a is a surface that faces the attachment target surface 1a in a parallel state in a case where the attachment jig 3 is disposed on the attachment target surface 1a.

The detachment member first contact surface 5b is a surface serving as a reference when positioning the longitudinal direction Da of the pressing member 4 with respect to the detachment member 5 on the attachment target surface 1a. The detachment member first contact surface 5b is a surface that can come into contact with the pressing member first reference surface 4c of the first positioning portion 41. The detachment member first contact surface 5b according to the present embodiment is a surface that forms the pressing member storage recessed portion 55. The detachment member first contact surface 5b faces the second side in the longitudinal direction Da. The detachment member first contact surface 5b is a surface orthogonal to the second abutting surface 5a. The detachment member first contact surface 5b is a surface disposed in parallel with the second support surface 1c and faces the same direction in the case where the attachment jig 3 is disposed on the attachment target surface 1a. The detachment member first contact surface 5b is disposed to face the pressing member first reference surface 4c in the case where the detachment member 5 is disposed on the attachment target surface 1a with the pressing member 4.

The detachment member second contact surface 5c is a surface serving as a reference when positioning the pressing member 4 in the short direction Db with respect to the detachment member 5 on the attachment target surface 1a. The detachment member second contact surface 5c is a surface that can come into contact with the pressing member second reference surface 4d of the first positioning portion 41. The detachment member second contact surface 5c faces the first side in the short direction Db. The detachment member second contact surface 5c is a surface orthogonal to the detachment member first contact surface 5b. As illustrated in FIG. 3, the detachment member second contact surface 5c is inclined with respect to the second abutting surface 5a. Specifically, the detachment member second contact surface 5c is an inclined surface inclined so that an angle formed with the second abutting surface 5a is an obtuse angle. The detachment member second contact surface 5c according to the present embodiment is a surface that forms the pressing member storage recessed portion 55 with the detachment member first contact surface 5b. The detachment member second contact surface 5c is disposed so as to face the pressing member second reference surface 4d in the case where the detachment member 5 is disposed on the attachment target surface 1a with the pressing member 4.

As illustrated in FIG. 2, the main body portion second support target surface 5d is a surface serving as a reference when positioning the detachment member 5 in the longitudinal direction Da with respect to the fixing target member 1. The main body portion second support target surface 5d is a surface that can come into contact with the second support surface 1c. The main body portion second support target surface 5d according to the present embodiment is formed integrally with a reinforcement portion second support target surface 5f of the detachment reinforcement portion 52 described later. The body portion second support target surface 5d forms a portion of a second support target surface 5g that can come into contact with the second support surface 1c in the detachment member 5. The main body portion second support target surface 5d is an end surface on the first side in the longitudinal direction Da of the detachment main body portion 51. The main body portion second support target surface 5d is a surface orthogonal to the second abutting surface 5a. The main body portion second support target surface 5d is a surface parallel to the detachment member first contact surface 5b and facing a side opposite to the longitudinal direction Da. The main body portion second support target surface 5d is a flat surface that faces the second support surface 1c in a parallel state in the case where the attachment jig 3 is disposed on the attachment target surface 1a.

The detachment reinforcement portion 52 can be positioned in the longitudinal direction Da and the short direction Db of the detachment member 5 with respect to the fixing target member 1 on the attachment target surface 1a. The detachment reinforcement portion 52 can come into contact with the fixing target member 1. The detachment reinforcement portion 52 has a rectangular flat plate shape extending in the longitudinal direction Da and the vertical direction Dv. The detachment reinforcement portion 52 is formed to be parallel to the flange portion 12 when disposed on the attachment target surface 1a. The detachment reinforcement portion 52 extends vertically from the end portion on the second side in the short direction Db of the detachment main body portion 51. In the present embodiment, the detachment reinforcement portion 52 and the detachment main body portion 51 are integrally formed, so that in the detachment member 5, the cross-sectional shape orthogonal to the longitudinal direction Da is formed in L shape. The detachment reinforcement portion 52 according to the present embodiment includes a first support target surface 5e and the reinforcement portion second support target surface 5f.

The first support target surface 5e is a surface serving as a reference when positioning the detachment member 5 in the short direction Db with respect to the fixing target member 1. The first support target surface 5e is a surface that can come into contact with the first support surface 1b. The first support target surface 5e according to the present embodiment is a surface facing the second side in the short direction Db of the detachment reinforcement portion 52. The first support target surface 5e is a surface orthogonal to the second abutting surface 5a. The first support target surface 5e is a surface that faces the first support surface 1b in a parallel state in the case where the attachment jig 3 is disposed on the attachment target surface 1a.

The reinforcement portion second support target surface 5f is a surface serving as a reference when positioning the detachment member 5 in the longitudinal direction Da with respect to the fixing target member 1. The reinforcement portion second support target surface 5f is a surface that can come into contact with the second support surface 1c. The reinforcement portion second support target surface 5f according to the present embodiment forms a portion of the second support target surface 5g that can come into contact with the second support surface 1c in the detachment member 5. The reinforcement portion second support target surface 5f is an end surface on the first side in the longitudinal direction Da of the detachment reinforcement portion 52. The reinforcement portion second support target surface 5f is a surface orthogonal to the first support target surface 5e. The reinforcement portion second support target surface 5f is a surface that faces the second support surface 1c in a parallel state in the case where the attachment jig 3 is disposed on the attachment target surface 1a.

In addition, the detachment member 5 further includes a first abutting portion 56, a second abutting portion 57, and a connection surface 58. The first abutting portion 56 can come into contact with the attachment target surface 1a, the first support surface 1b, and the second support surface 1c. Therefore, the first abutting portion 56 can position the detachment member 5 with respect to the fixing target member 1. The first abutting portion 56 according to the present embodiment is the second abutting surface 5a and the main body portion second support target surface 5d of the detachment main body portion 51, and the first support target surface 5e and the reinforcement portion second support target surface 5f of the detachment reinforcement portion 52.

The second abutting portion 57 can come into contact with the pressing member 4 on the attachment target surface 1a. The second abutting portion 57 according to the present embodiment can come into contact with the pressing member first reference surface 4c and the pressing member second reference surface 4d. The second abutting portion 57 serves as a reference with respect to the detachment member 5 when the pressing member 4 is disposed. The second abutting portion 57 according to the present embodiment is the detachment member first contact surface 5b and the detachment member second contact surface 5c of the detachment main body portion 51.

The connection surface 58 is a surface that connects the second abutting surface 5a and the first support target surface 5e. The connection surface 58 is an inclined surface inclined with respect to the second abutting surface 5a and the first support target surface 5e. Therefore, the connection surface 58 does not be in contact with the web portion 11 or the flange portion 12 in the case where the attachment jig 3 is disposed on the attachment target surface 1a.

The guide portion 9 guides the movement of the detachment member 5 with respect to the pressing member 4 in an inclination direction. The inclination direction is a direction inclined with respect to the attachment target surface 1a. The inclination direction according to the present embodiment is a direction inclined with respect to the attachment target surface 1a and the first support surface 1b, and is parallel to the direction where the second support surface 1c extends. Specifically, the inclination direction according to the present embodiment is a direction away from the first support surface 1b as the direction goes upward from the attachment target surface 1a in the vertical direction Dv. The pressing member second reference surface 4d and the detachment member second contact surface 5c according to the present embodiment are formed so as to extend in a plane direction including the inclination direction with respect to the attachment target surface 1a.

The guide portion 9 according to the present embodiment is formed on the pressing member second reference surface 4d and the detachment member second contact surface 5c. In the present embodiment, the entire area of the pressing member second reference surface 4d and the detachment member second contact surface 5c is an inclined surface that extends in the inclination direction. Therefore, the guide portion 9 according to the present embodiment is the pressing member second reference surface 4d and the detachment member second contact surface 5c.

The first temporary fixing member 6 temporarily fixes the pressing member 4 to the fixing target member 1. The first temporary fixing member 6 can be made immovable by pressing the pressing member 4 against the attachment target surface 1a. Specifically, the first temporary fixing member 6 according to the present embodiment is a tool for fixing two members by interposing a target object such as a shackle screw clamp between two caps.

The second temporary fixing member 7 temporarily fixes the detachment member 5 to the fixing target member 1. The second temporary fixing member 7 can be made immovable by pressing the detachment member 5 against the attachment target surface 1a. Specifically, the second temporary fixing member 7 according to the present embodiment is the same member as the first temporary fixing member 6. The second temporary fixing member 7 is, for example, a tool for fixing two members by interposing a target object such as a shackle screw clamp between two caps.

Figure 5:
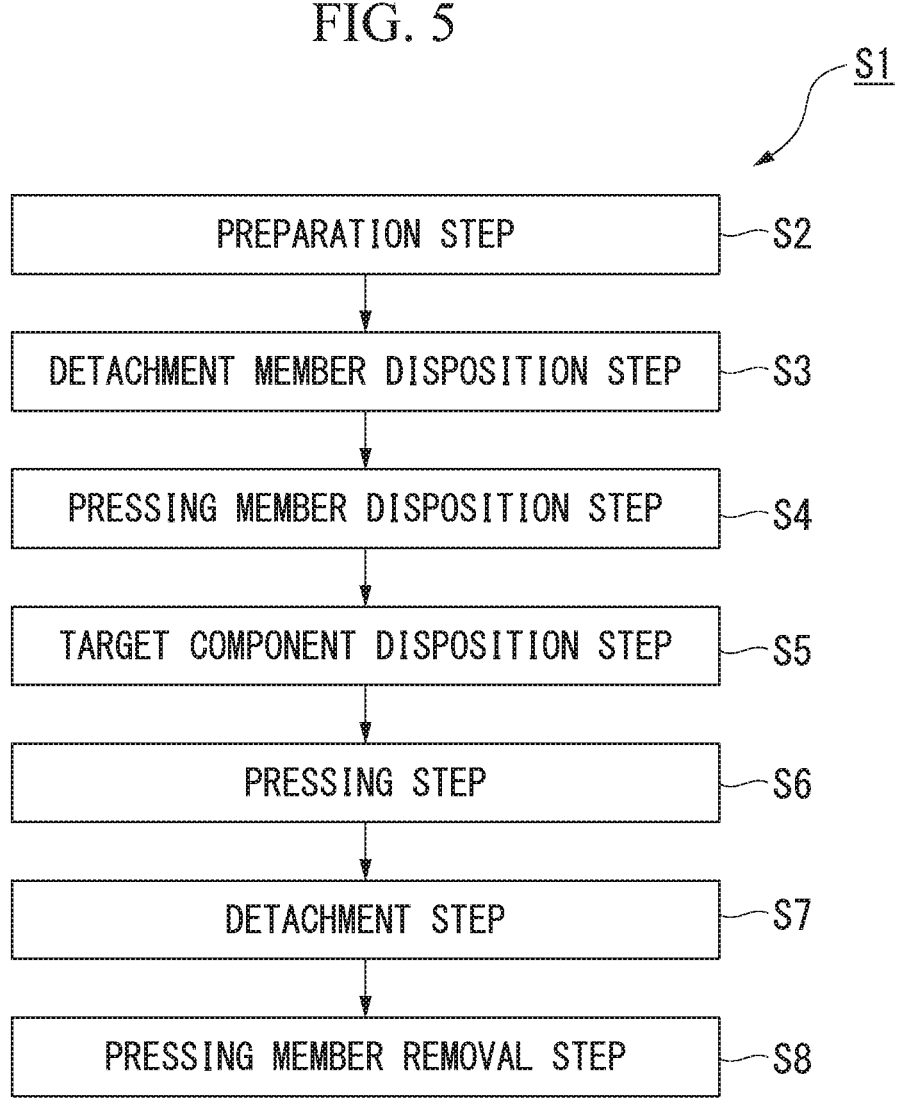
FIG. 5 is a flowchart describing an attachment method according to the embodiment of the present invention.

Next, the attachment method S1 for the target component 2 to the fixing target member 1 using the attachment jig 3 will be described. In the attachment method S1, the target component 2 is attached to the attachment target surface 1a. As illustrated in FIG. 5, the attachment method S1 according to the present embodiment includes a preparation step S2, a detachment member disposition step S3, a pressing member disposition step S4, a target component disposition step S5, a pressing step S6, and a detachment step S7, and a pressing member removal step S8.

In the attachment method S1, first, the preparation step S2 is performed. In the preparation step S2, the pressing member 4, the detachment member 5, the fixing target member 1, and the target component 2 are prepared.

Figure 6:
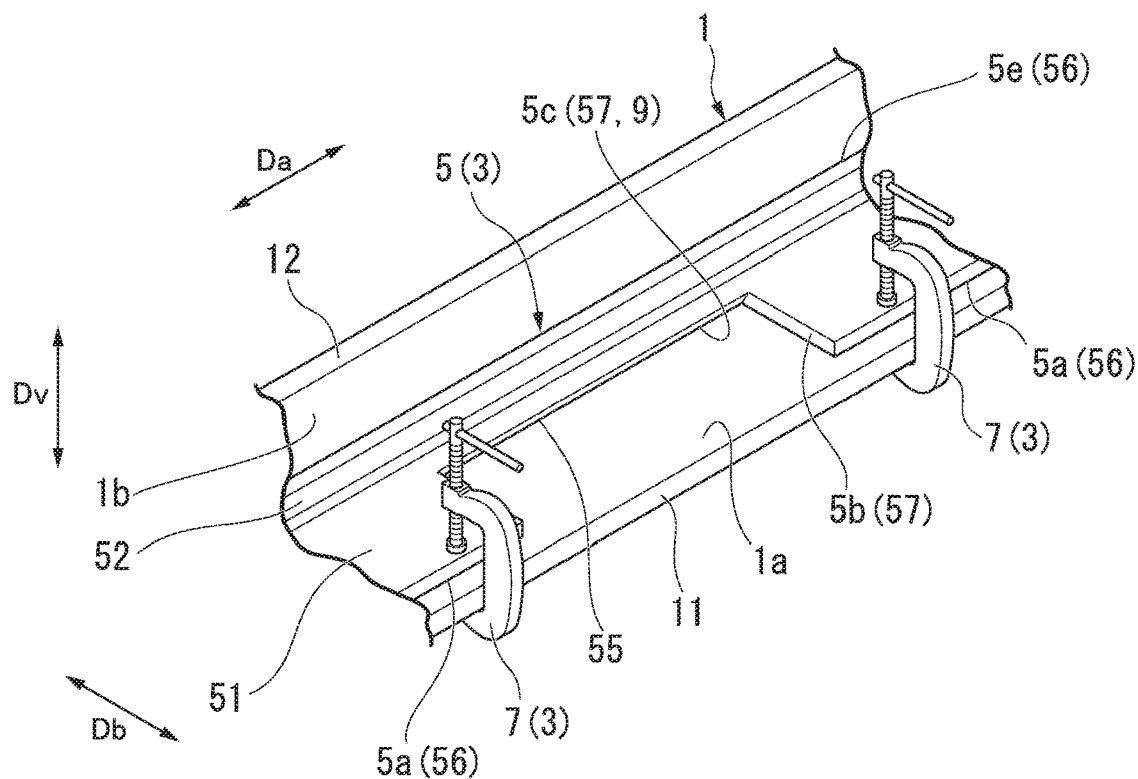
FIG. 6 is a perspective view illustrating a detachment member disposition step according to the embodiment of the present invention.

Next, in the attachment method S1, the detachment member disposition step S3 is performed. In the detachment member disposition step S3, the first abutting portion 56 is brought into contact with the first support surface 1b and the second support surface 1c, and the detachment member 5 is disposed on the attachment target surface 1a. As illustrated in FIG. 6, in the detachment member disposition step S3 according to the present embodiment, the detachment member 5 is disposed in a state where the second abutting surface 5a is brought into contact with the attachment target surface 1a. In this state, the detachment member 5 is moved on the attachment target surface 1a so that the first support target surface 5e is brought into contact with the first support surface 1b and the second support target surface 5g is brought into contact with the second support surface 1c. As a result, the position of the detachment member 5 with respect to the fixing target member 1 is determined. In this state, the detachment member 5 is pressed against the fixing target member 1 by a plurality of second temporary fixing members 7. The plurality of second temporary fixing members 7 are temporarily fixed by interposing the detachment main body portion 51 and the web portion 11 at a location away in the longitudinal direction Da so as to interpose the pressing member storage recessed portion 55. As a result, the detachment member 5 is immovable in a state where the position with respect to the fixing target member 1 is determined.

Figure 7:
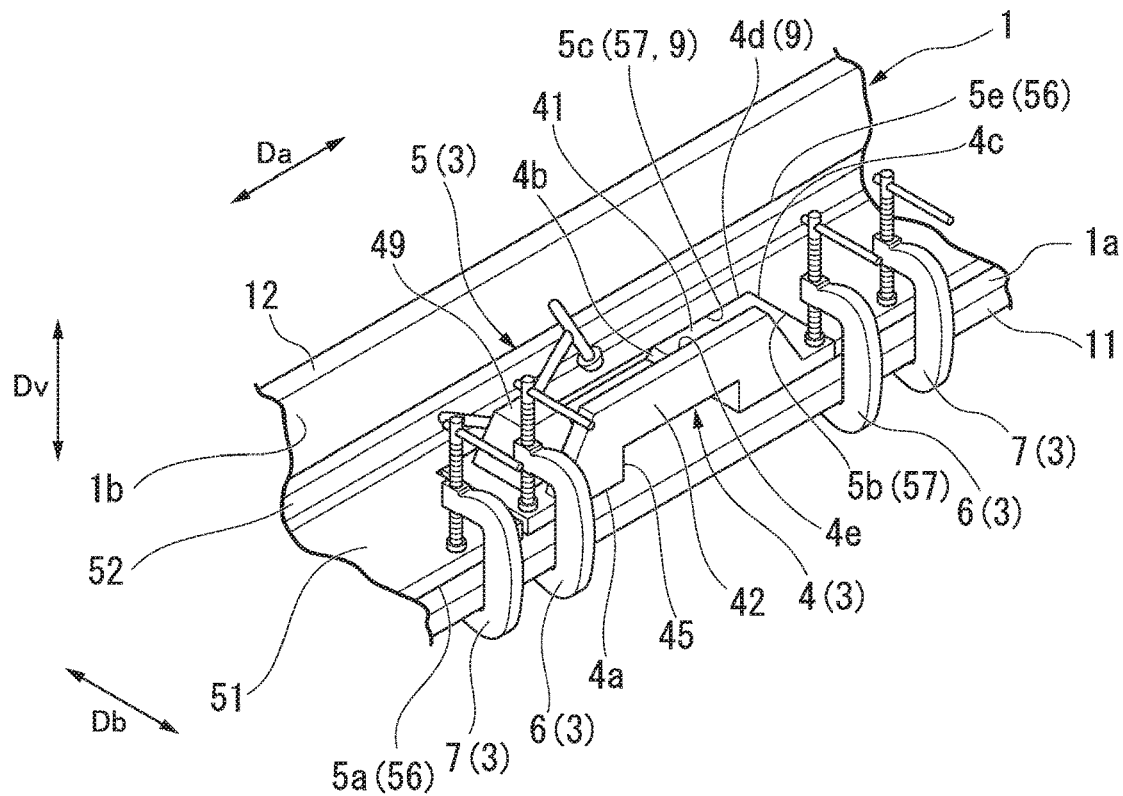
FIG. 7 is a perspective view illustrating a pressing member disposition step according to the embodiment of the present invention.
Figure 8:
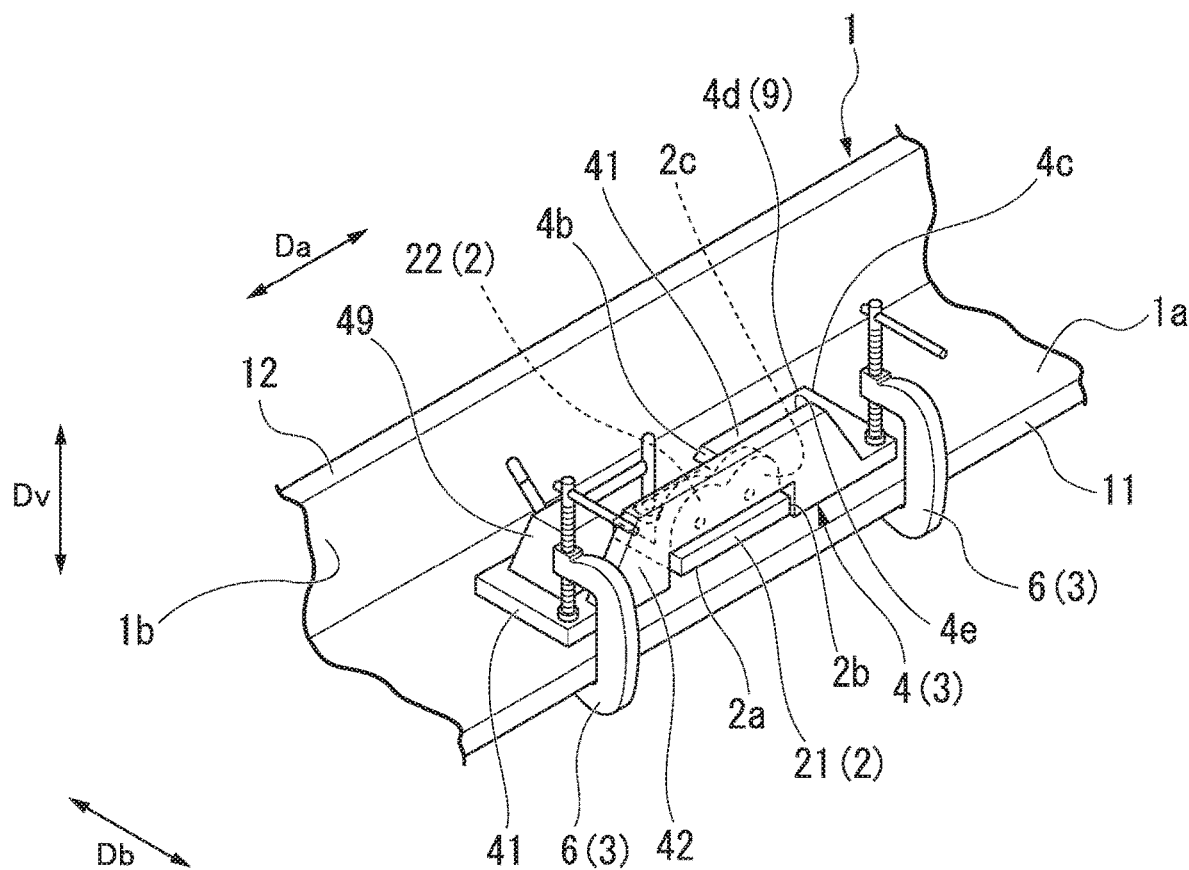
FIG. 8 is a perspective view illustrating a detachment step according to the embodiment of the present invention.

Next, in attachment method S1, the pressing member disposition step S4 is performed. In the pressing member disposition step S4, the pressing member 4 is brought into contact with the second abutting portion 57, and the pressing member 4 is disposed on the attachment target surface 1a. As illustrated in FIG. 7, in the pressing member disposition step S4 according to the present embodiment, the pressing member 4 is disposed in the pressing member storage recessed portion 55 in a state where the first abutting surface 4a is in contact with the attachment target surface 1a. In this state, the pressing member 4 is moved on the attachment target surface 1a so that the pressing member first reference surface 4c is brought into contact with the detachment member first contact surface 5b, and the pressing member second reference surface 4d is brought into contact with the detachment member second contact surface 5c. As a result, the position of the pressing member 4 with respect to the detachment member 5 whose position with respect to the fixing target member 1 is fixed is determined. In this state, the pressing member 4 is pressed against the fixing target member 1 by a plurality of first temporary fixing members 6. The plurality of first temporary fixing members 6 are temporarily fixed by interposing the first positioning portion 41 and the web portion 11 at a location away in the longitudinal direction Da so as to interpose the target component storage recessed portion 45. As a result, the pressing member 4 is immovable in a state where the position with respect to the fixing target member 1 is determined.

Next, in the attachment method S1, as illustrated in FIG. 5, the target component disposition step S5 is performed. In the target component disposition step S5, the target component 2 is brought into contact with the first positioning portion 41 and the second positioning portion 42, and the target component 2 applied with the adhesive is disposed on the attachment target surface 1a. In the target component disposition step S5, the adhesive is applied to the attachment surface 2a. The target component 2 is disposed in the target component storage recessed portion 45 in a state where the attachment surface 2a to which the adhesive is applied is brought into contact with the attachment target surface 1a. In this state, the target component 2 is moved on the attachment target surface 1a so that the first reference surface 2b is brought into contact with the pressing member first contact surface 4b and the second reference surface 2c is brought into contact with the pressing member second contact surface 4e. As a result, the position of the target component 2 with respect to the pressing member 4 whose position with respect to the fixing target member 1 is fixed is determined.

Next, in the attachment method S1, a pressing step S6 is performed. In the pressing step S6, the target component 2 positioned by the first positioning portion 41 and the second positioning portion 42 is pressed by the pressing portion 49 toward the attachment target surface 1a. In the pressing step S6 according to the present embodiment, the attachment portion 21 is pressed toward the attachment target surface 1a by a toggle clamp provided in the first positioning portion 41 to be in a pressing state. As a result, the attachment surface 2a is in close contact with the attachment target surface 1a by being interposed between the pressing portion 49 and the fixing target member 1. As a result, the target component 2 is immovable with respect to the pressing member 4 and the fixing target member 1. That is, the target component 2 is immovable in a state where the position with respect to the fixing target member 1 is determined.

Next, in the attachment method S1, the detachment step S7 is performed. In the detachment step S7, the detachment member 5 that is in contact with the pressing member 4 and the fixing target member 1 is detached from the fixing target member 1 and the pressing member 4 while the target component 2 is pressed against the attachment target surface 1a. In the detachment step S7 according to the present embodiment, the second temporary fixing member 7 that temporarily fixes the detachment member 5 is removed from the detachment member 5 and the fixing target member 1. Thereafter, the detachment member 5 is moved in the inclination direction with respect to the fixing target member 1 and the pressing member 4. In the present embodiment, the detachment member second contact surface 5c and the pressing member second reference surface 4d are formed in parallel to each other as inclined surfaces extending in the inclination direction. By moving the detachment member 5 along the inclined surface in the inclination direction, the detachment member 5 is moved more smoothly than a case of moving in the vertical direction Dv or the short direction Db. As a result, the detachment member 5 is detached from the fixing target member 1 and the pressing member 4.

Next, in the attachment method S1, the pressing member removal step S8 is performed. In the pressing member removal step S8, the pressing member 4 is detached from the fixing target member 1 after the adhesive is cured. In the pressing member removal step S8 according to the present embodiment, after the adhesive is cured and the attachment surface 2a and the attachment target surface 1a are completely fixed, the pressing state by the pressing portion 49 is released. Specifically, the pressing portion 49 that presses the attachment portion 21 against the attachment target surface 1a is detached from the attachment portion 21. Thereafter, the first temporary fixing member 6 temporary fixing the pressing member 4 is removed from the pressing member 4 and the fixing target member 1. The pressing member 4 is removed from the fixing target member 1. As a result, the attachment jig 3 is removed from the fixing target member 1, and only the target component 2 is fixed to the fixing target member 1.

In the attachment method S1 using the attachment jig 3 as described above, the position of the target component 2 on the attachment target surface 1a of the fixing target member 1 is determined by the detachment member 5 and the pressing member 4. Therefore, no additional work is required to provide a positioning protrusion on the attachment target surface 1a of the fixing target member 1. In this state, the position of the target component 2 is temporarily fixed in a state where the attachment surface 2a is pressed against the attachment target surface 1a by pressing the attachment portion 21 against the attachment target surface 1a by the pressing portion 49. Only the pressing member 4 and the target component 2 remain on the attachment target surface 1a by detaching the detachment member 5 from the pressing member 4 while the target component 2 is temporarily fixed. Therefore, a space on the attachment target surface 1a around the target component 2 can be made until the adhesive is cured and the target component 2 is completely fixed to the fixing target member 1. As a result, the work space for performing other work until the target component 2 is completely attached to the fixing target member 1 can be ensured. Therefore, it is possible to suppress the deterioration of work efficiency due to the pressure on the work space.

In addition, since the guide portion 9 is provided, the detachment member 5 is moved in the inclination direction, not in the direction along the attachment target surface 1a or the first support surface 1b as in the vertical direction Dv or the short direction Db. By moving the detachment member 5 in the inclination direction inclined to the attachment target surface 1a and the first support surface 1b, it is possible to reduce the resistance such as friction received by the detachment member 5 from the attachment target surface 1a or the first support surface 1b. As a result, the detachment member 5 can be easily detached from the pressing member 4.

In addition, the guide portion 9 is formed in the pressing member second reference surface 4d and the detachment member second contact surface 5c which are mutually in contact with each other. Therefore, it is possible to reduce resistance such as friction received by the detachment member 5 from the pressing member 4. As a result, the detachment member 5 is more easily detached from the pressing member 4.

In addition, the guide portion 9 is formed by making the pressing member second reference surface 4d and the detachment member second contact surface 5c the inclined surfaces. Therefore, the guide portion 9 can be provided without using other members such as rails. In particular, in the present embodiment, since the entire pressing member second reference surface 4d and the detachment member second contact surface 5c are the inclined surfaces, resistance such as friction received by the detachment member 5 from the pressing member 4 can be reduced with a simple configuration.

In addition, the pressing member 4 is temporarily fixed to the fixing target member 1 by the first temporary fixing member 6, and the detachment member 5 is temporarily fixed to the fixing target member 1 by the second borrow fixing member. Therefore, it is difficult for the detachment member 5 whose position with respect to the fixing target member 1 is determined to move from the determined position. Similarly, it is difficult for the pressing member 4 whose position with respect to the detachment member 5 is determined to move from the determined position. As a result, the positioning accuracy when positioning the target component 2 with respect to the fixing target member 1 via the pressing member 4 and the detachment member 5 can be improved.

Other Modifications of Embodiment

Although the embodiments of the present invention is described in detail with reference to the drawings, each configuration and combination thereof in each embodiment is an example, and the addition, omission, replacement, and other changes of the configuration can be made without departing from the gist of the present invention. In addition, the present invention is not limited by the embodiment, and is limited only by the scope of the aspects.

The fixing target member 1 is limited to the configuration in which the rib portion 13 is formed in the L-shaped member in which only the web portion 11 and the flange portion 12 extend in the longitudinal direction Da as in the present embodiment. The fixing target member 1 may be a structure which has the first support surface 1b and the second support surface 1c which intersect with respect to the attachment target surface 1a, respectively. Therefore, for example, the fixing target member 1 may have a configuration in which the rib portion 13 is provided with respect to an H-shaped steel.

In addition, the attachment target surface 1a, the first support surface 1b, and the second support surface 1c are not limited to being flat surfaces. The attachment target surface 1a and the first support surface 1b may be the surfaces extending in the longitudinal direction Da in a state where a cross section orthogonal to the longitudinal direction Da is slightly curved. In addition, each surface of the pressing member 4 and the detachment member 5 corresponding to the attachment target surface 1a, the first support surface 1b, and the second support surface 1c may be curved according to the shape of the attachment target surface 1a, the first support surface 1b, and the second support surface 1c.

In addition, the guide portion 9 is not limited to being formed on the pressing member second reference surface 4d and the detachment member second contact surface 5c. It is preferable that the guide portion 9 is formed on a surface which can mutually come into contact with the pressing member 4 and the detachment member 5. Therefore, the guide portion 9 may be formed on the pressing member first reference surface 4c and the detachment member first contact surface 5b. In this case, the inclination direction is, for example, a direction away from the second support surface 1c as it goes upward from the attachment target surface 1a in the vertical direction Dv.

In addition, the guide portion 9 is not limited to being the inclined surface. The guide portion 9 may be a structure which can guide the movement in the inclination direction. For example, the guide portion 9 may be formed with a step shape.

INDUSTRIAL APPLICABILITY

According to the attachment jig 3 and the attachment method S1, a work space can be secured.

REFERENCE SIGNS LIST 1 fixing target member
11 web portion
12 flange portion
13 rib portion
1a attachment target surface
1b first support surface
1c second support surface
Da longitudinal direction
Db short direction
Dv vertical direction
2 target component
21 attachment portion
2a attachment surface
2b first reference surface
22 holding portion
2c second reference surface
3 attachment jig
4 pressing member
40 positioning portion
41 first positioning portion
4a first abutting surface
4b pressing member first contact surface
4c pressing member first reference surface
4d pressing member second reference surface
42 second positioning portion
4e pressing member second contact surface
45 target component storage recessed portion
49 pressing portion
5 detachment member
51 detachment main body portion
5a second abutting surface
5b detachment member first contact surface
5c detachment member second contact surface
5d main body portion second support target surface
55 pressing member storage recessed portion
52 detachment reinforcement portion
5e first support target surface
5f reinforcement portion second support target surface
5g second support target surface
56 first abutting portion
57 second abutting portion
58 connection surface
6 first temporary fixing member
7 second temporary fixing member
9 guide portion
S1 attachment method
S2 preparation step
S3 detachment member disposition step
S4 pressing member disposition step
S5 target component disposition step
S6 pressing step
S7 detachment step
S8 pressing member removal step

The invention claimed is:

1. An attachment jig used when attaching a target component to an attachment target surface of a fixing target member which includes the attachment target surface, a first support surface extending in a direction intersecting the attachment target surface, and a second support surface extending in a direction intersecting the attachment target surface and the first support surface, wherein the fixing target member includes a web portion on which the attachment target surface is formed, a flange portion on which the first support surface is formed and which extends from the web portion, and a rib portion on which the second support surface is formed and which extends from the web portion and the flange portion, the attachment jig comprising:
a pressing member that includes a positioning portion configured to come into contact with the target component on the attachment target surface and position the target component in a direction where the attachment target surface extends, and a pressing portion configured to press the target component positioned by the positioning portion toward the attachment target surface; and
a detachment member that includes a first abutting portion configured to come into contact with the attachment target surface, the first support surface, and the second support surface, and a second abutting portion configured to come into contact with the pressing member on the attachment target surface, the detachment member being configured to cause the pressing member to be positioned in the direction where the attachment target surface extends with respect to the first support surface and the second support surface, and detachable from the pressing member,
a first temporary fixing member that temporarily fixes the pressing member to the fixing target member; and
a second temporary fixing member that temporarily fixes the detachment member to the fixing target member,
wherein the detachment member has a pressing member storage recessed portion which is configured to store the pressing member and the target component in a state where the attachment jig is disposed on the attachment target surface,
the pressing member includes a pressing member reference surface that comes into contact with the detachment member and extends in the direction intersecting the attachment target surface, and
the pressing member storage recessed portion includes a detachment member contact surface that comes into contact with the pressing member reference surface.

2. The attachment jig according to claim 1, further comprising:
a guide portion that is configured to guide the detachment member with respect to the pressing member in an inclination direction inclined with respect to the attachment target surface and the first support surface and parallel to a direction where the second support surface extends.

3. The attachment jig according to claim 2,
wherein
the guide portion is formed on the pressing member reference surface and the detachment member contact surface.

4. The attachment jig according to claim 3,
wherein the guide portion is an inclined surface extending in the inclination direction.

5. The attachment jig according to claim 1,
wherein the pressing portion is a toggle clamp.

* * * * *